United States Patent
Molisch et al.

(10) Patent No.: US 7,573,933 B2
(45) Date of Patent: Aug. 11, 2009

(54) ADAPTIVE DELAY ADJUSTMENT FOR TRANSMITTED REFERENCE IMPULSE RADIO SYSTEMS

(75) Inventors: Andreas F. Molisch, Arlington, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 638 days.

(21) Appl. No.: 11/029,135

(22) Filed: Jan. 4, 2005

(65) Prior Publication Data
US 2006/0209924 A1 Sep. 21, 2006

(51) Int. Cl.
*H04B 1/00* (2006.01)
(52) U.S. Cl. ....................................................... 375/138
(58) Field of Classification Search ................. 375/295, 375/316, 130, 152, 140–150, 259, 260, 267, 375/285, 296, 324–326, 340–343, 346–349, 375/354, 358, 138; 455/39, 63.1, 130, 296
See application file for complete search history.

(56) References Cited

U.S. PATENT DOCUMENTS

| | | | | |
|---|---|---|---|---|
| 4,398,062 A * | 8/1983 | McRae et al. | ................ | 380/257 |
| 5,123,029 A * | 6/1992 | Bantz et al. | .................. | 375/133 |
| 5,414,734 A * | 5/1995 | Marchetto et al. | ........... | 375/267 |
| 6,370,397 B1* | 4/2002 | Popovic et al. | .............. | 455/561 |
| 6,470,057 B1* | 10/2002 | Hui et al. | ..................... | 375/294 |
| 2001/0053175 A1* | 12/2001 | Hoctor et al. | ............... | 375/130 |
| 2003/0043934 A1* | 3/2003 | Roberts | ...................... | 375/316 |
| 2003/0069025 A1* | 4/2003 | Hoctor et al. | ............... | 455/456 |
| 2003/0236074 A1* | 12/2003 | Ishii et al. | ..................... | 455/69 |
| 2006/0098760 A1* | 5/2006 | Shen et al. | .................. | 375/299 |

OTHER PUBLICATIONS van Stralen et al, "Delay hopped transmitted reference experimental results", Digest of Papers, 2002 IEEE Conference on Ultra Wideband Systems and Technologies, 2002., pp. 93-98.*
M. Win and R. A. Scholtz, "Ultra-Wide Band Width Time-Hopping Spread-Spectrum Impulse Radio for Wireless Multiple-Access Communications," IEEE Trans. On Communications, vol. 48, No. 4 Apr. 2000, pp. 679-691.
F. Tufvesson and A. F. Molisch, "Ultra-Wideband Communication using Hybrid Matched Filter Correlation Receivers" Proc. ICC 2004.
* cited by examiner

*Primary Examiner*—Kevin M Burd
*Assistant Examiner*—Vineeta S Panwalkar
(74) *Attorney, Agent, or Firm*—Dirk Brinkman; Gene Vinokur

(57) ABSTRACT

A method determines a delay time between reference and data pulses in a time-hopping impulse radio system. Channel state information of a channel between two transceivers is estimated periodically. The delay time frame between the reference and data pulses is then determined according to the channel state information.

17 Claims, 6 Drawing Sheets

200

500

ADAPTIVE DELAY ADJUSTMENT FOR TRANSMITTED REFERENCE IMPULSE RADIO SYSTEMS

FIELD OF THE INVENTION

The invention relates generally to communication systems, and more particularly to transmitted reference modulation formats used in wireless communication systems.

BACKGROUND OF THE INVENTION

In the United States, the Federal Communications Commission (FCC) allows a restricted unlicensed use of ultra-wide bandwidth (UWB) signals for wireless communication systems, "First Report and Order," Feb. 14, 2002. The UWB signals must be in the frequency range from 3.1 to 10.6 GHz, and have a minimum bandwidth of 500 MHz. The FCC order also limits the power spectral density and peak emissions power of UWB signals to less than −43.1 dBm/MHz.

One modulation method for UWB uses extremely short time pulses, e.g., 1/1,000,000,000 of a second or less, to generate signals with bandwidths greater than 500 MHz, which corresponds to a wavelength of about 300 mm. Wireless systems that use short pulses are commonly referred to as impulse radio (IR) systems.

As shown in FIG. 1A, four different modulation techniques are commonly used for IR systems, pulse position modulation (PPM) 11, pulse amplitude modulation (PAM) 12, on-off keying (OOK) 13, and bi-phase shift keying (BPSK) 14.

As an advantage, UWB systems achieve high data rates, and are resistant to multi-path impairments. This is due to large processing gains. Additionally, IR systems enable low cost, low duty cycle, low power transceivers that do not require local oscillators for heterodyning. Because UWB transceivers are primarily implemented in the digital domain, the UWB transceivers can be integrated in a semiconductor chip. In UWB systems, multiple transceivers concurrently share the same spectrum without interference. UWB systems are ideal for short range, high-speed networks in homes, businesses, and educational institutions. Sensor networks can also use UWB transceivers.

A time-hopping (TH) IR is described by M. Win and R. A. Scholtz, "Ultra-Wide Band Width Time-Hopping Spread-Spectrum Impulse Radio for Wireless Multiple-Access Communications," in IEEE Trans. On Communications, Vol. 48, No. 4 Apr. 2000, pp. 679-691. In that TH-IR system, each bit or symbol is represented by $N_f$ pulses, where $N_f$ is a positive integer. The time to transmit a bit is $T_s$. This is called the symbol duration. The time $T_s$ is further partitioned into frames $T_f$, and the frames are partitioned into chips $T_c$, corresponding typically to a pulse duration. If $N_c$ represents the number of chips in a frame and $N_f$ represents the number of frames in a symbol, then $T_s$, $T_f$ and $T_c$ are related by $$T_s = N_f T_f = N_f N_c T_c. \quad (1)$$

FIG. 1B shows the relationship between the symbol time $T_s$ 101, the frame duration $T_f$ 102, and the chip duration $T_c$ 103 for pulses 104 for an example prior art TH-IR waveform 110 for a '0' bit, and a waveform 120 for a '1' bit. Typically, the pulses are spaced pseudo-randomly among the available chips in a frame according to a "time-hopping" code to minimize multi-user interference.

As stated above, the modulation can be binary phase shift keying (BPSK). With BPSK, each bit b is represented as either a positive or negative one, i.e., b∈{−1, 1}. The transmitted signal has the form $$s(t) = \sum_{i=1}^{\infty} \sum_{j=1}^{N_f} h_{i,j} b_{\lfloor i/N_f \rfloor} p(t - jT_f - c_j T_c), \quad (2)$$

where $c_j$ represents the $j^{th}$ value of the TH code, in a range {0, 1, . . . , $N_c$−1}, and b is the $i^{th}$ modulation symbol. Additionally, an optional sequence denoted as $h_{i,j}$ can be applied to each pulse in the transmitted signal to 'shape' the spectrum of the transmitted signal and to reduce spectral lines. The sequence, $h_{i,j}$, is called a polarity scrambling sequence with values of either +1 or −1. Different amplitudes are also possible to further shape the spectrum.

FIG. 2 shows a conventional coherent TH-IR receiver 200. The receiver includes an automatic gain control (AGC) unit 210 coupled to an amplifier 220 that is connected to the receive antenna 230. The receiver also includes synchronization 240, timing control 250, channel estimation 260, MMSE equalizer 270, and decoder 280 units. Rake receiver fingers 290 input to an adder 295. Each rake receiver finger includes a pulse sequence generator, correlator and weight combiner. The rake receiver fingers reduce multipath interference.

One draw back of the above transmission scheme shown in FIG. 2 is the complexity of the receiver needed to demodulate the information. Typically, coherent receivers based on a RAKE architecture are required to receive and correctly demodulate the information. An alternative modulation format is called "transmitted reference" (TR). Transmitted reference was originally developed for narrowband carrier based communications systems, but is applicable to UWB impulse radio as well.

TR-IR systems eliminate the need for a RAKE receiver, R. Hoctor and H. Tomlinson, "Delay-Hopped Transmitted-Reference RF Communications," IEEE Conference on Ultra Wide Band Width Systems and Technologies, 2002, pp. 265-269." In a TR-IR system, the information is encoded as phase differences of successive pulses in the sequence. Each symbol in a TR-IR system is a sequence of time-hopped 'doublets' or pairs of consecutive pulses. Typically, the first pulse in the pair is referred to as a 'reference pulse' and the second pulse is referred to as a 'data pulse'. The two pulses are separated by a fixed unit of time delay $T_d$. Multiple pairs can be transmitted for one information bit. The transmitted waveform has the form $$s(t) = \sum_{i=0}^{\infty} \sum_{j=\frac{iN_f}{2}}^{(i+1)\frac{N_f}{2}-1} h_{i,j} \left( p(t - 2jT_f - c_j T_c) + b_{\lfloor 2j/N_f \rfloor} p(t - 2jT_f - c_j T_c - T_d) \right), \quad (3)$$

where $T_f$, $T_c$, $h_{ij}$ and $N_f$ are the same as for the TH-IR case.

FIG. 3 shows the relationship the symbol time $T_s$ 301, the frame time $T_f$ 308, the chip time $T_c$ 302, and the delay time $T_d$ 307 between reference pulse 303 and reference pulse 304 for example TH-IR waveforms. Waveform 310 is for a '0' bit and waveform 320 is for a '1' bit.

FIG. 4 shows a conventional TR-IR receiver 400, which is significantly simpler than the TH-IR receiver. The receiver includes delay 401, multiplier 402, integrator 403, sampler 407 and decision 404 units. The receiver essentially correlates the received signal 405 with a delayed version of itself 406.

Obviously, the TR-IR 400 receiver is less complex than a TH-IR receiver shown in FIG. 3. However, the reduced complexity is at the cost of requiring twice the number of pulses and the additional energy required for the reference pulses, nominally 3 dB or more.

An appropriate duration of the delay Td 307 between the reference pulse and the data pulse needs to be selected. A short delay duration can decreases multiple access interference (MAI). However, a short delay can also decrease bit error rate performance in the presence of time dispersive channels when the delay is shorter than the maximum excess delay time of the channel, as described by F. Tufvesson and A. F. Molisch, "Ultra-Wideband Communication using Hybrid Matched Filter Correlation Receivers" Proc. ICC 2004. In conventional TR-IR systems, the delay time is fixed, and cannot be changed as channel conditions change.

SUMMARY OF THE INVENTION

The invention provides a method and apparatus for adaptively determining a delay time between a reference pulse and a data pulse in a transmitted reference, impulse radio (TR-IR) system according to a current state of a wireless channel between two transceivers.

A receiver acquires channel state information (CSI), specifically a small-scale average power delay profile. The CSI and power delay profiles are used to determine the optimal delay time. The delay time delay can be determined in either the receiver or the transmitter. The delay time 307 can be updated as the CSI changes over time.

DETAILED DESCRIPTION OF THE PREFERRED EMBODIMENT

Figure 1A:
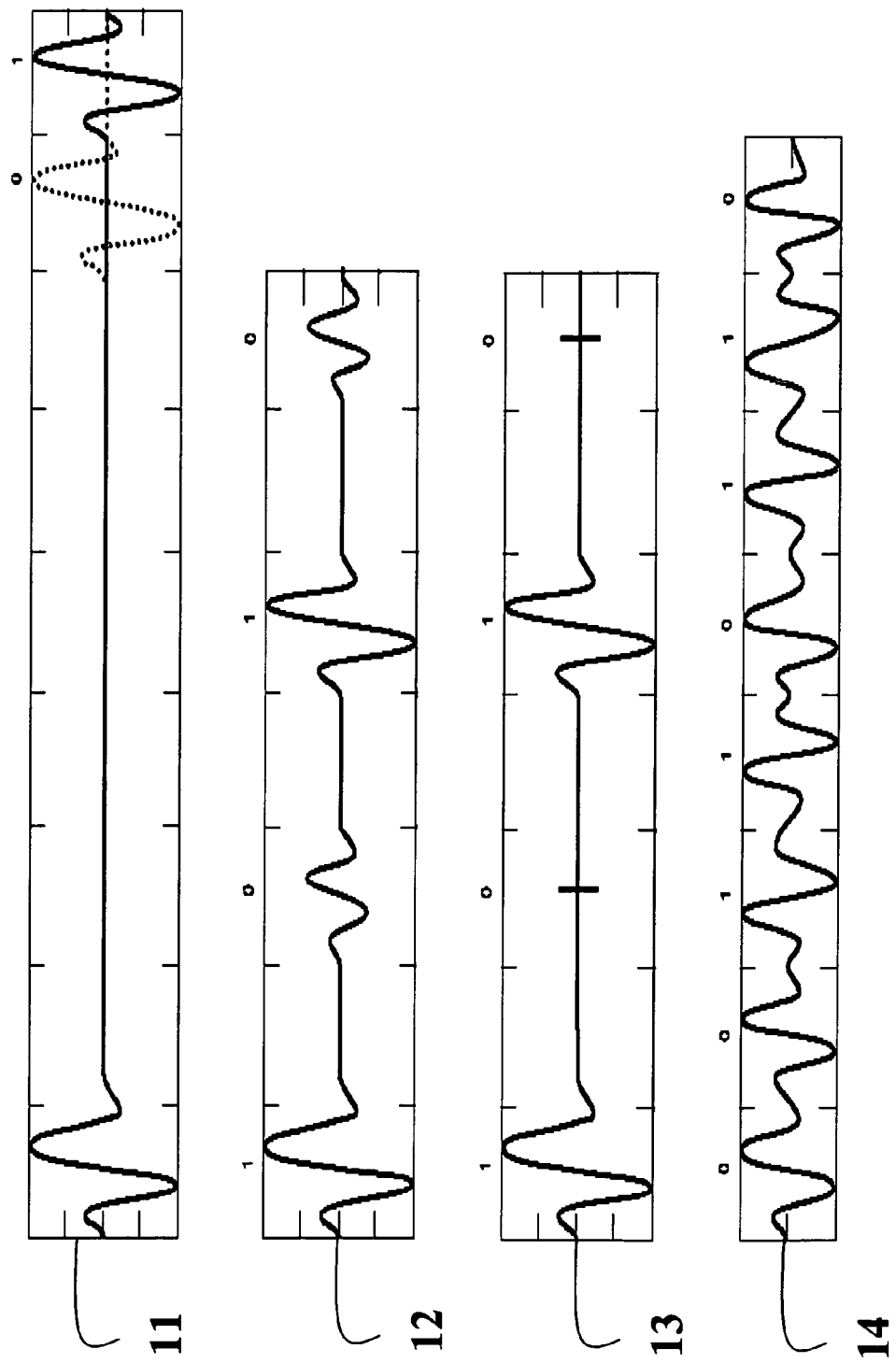
FIG. 1A is a timing diagram of prior art modulation techniques.
Figure 1B:
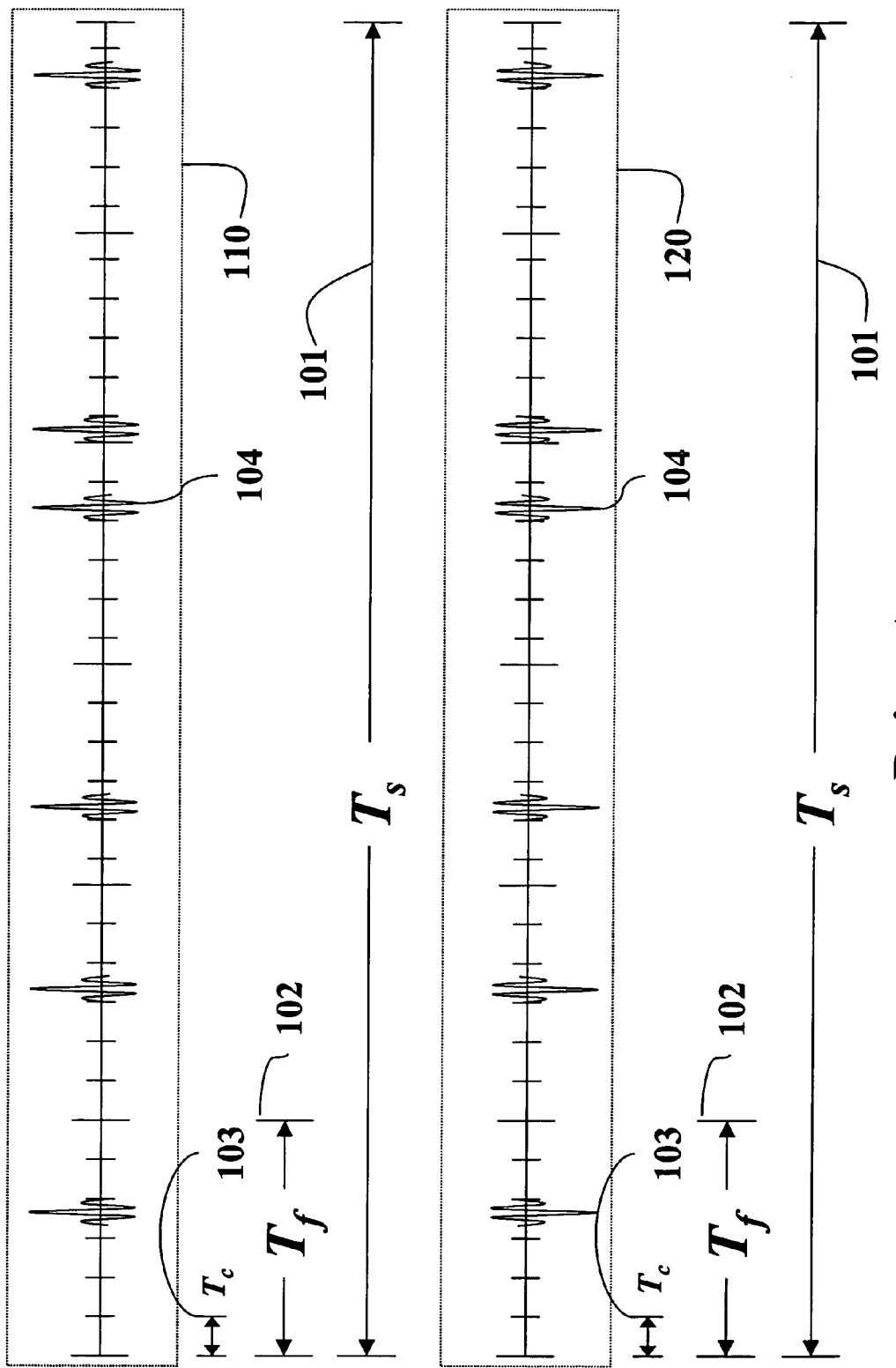
FIG. 1B is a timing diagram of prior art TH-IR modulation.
Figure 2:
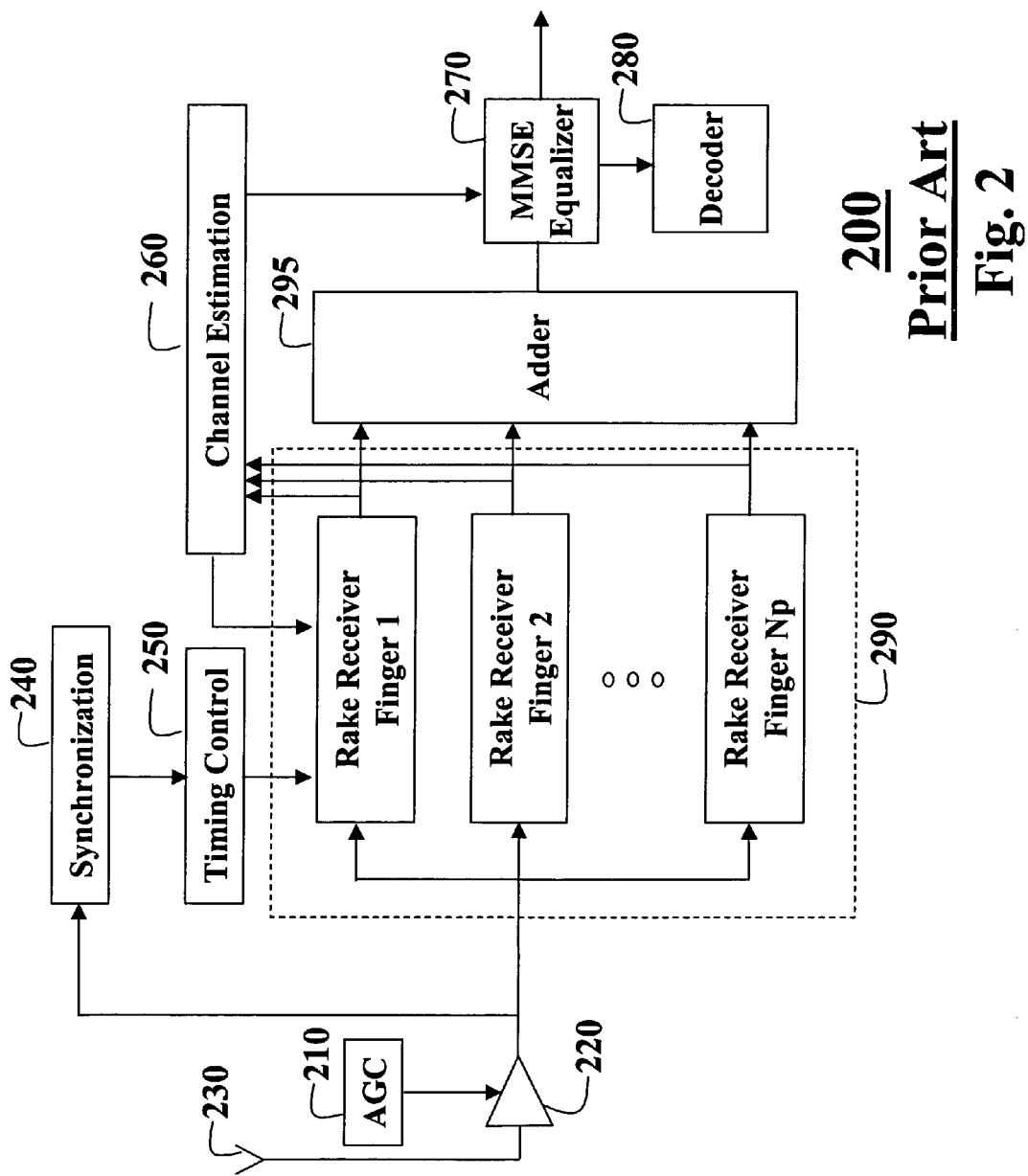
FIG. 2 is a block diagram of a prior art TH-IR receiver.
Figure 3:
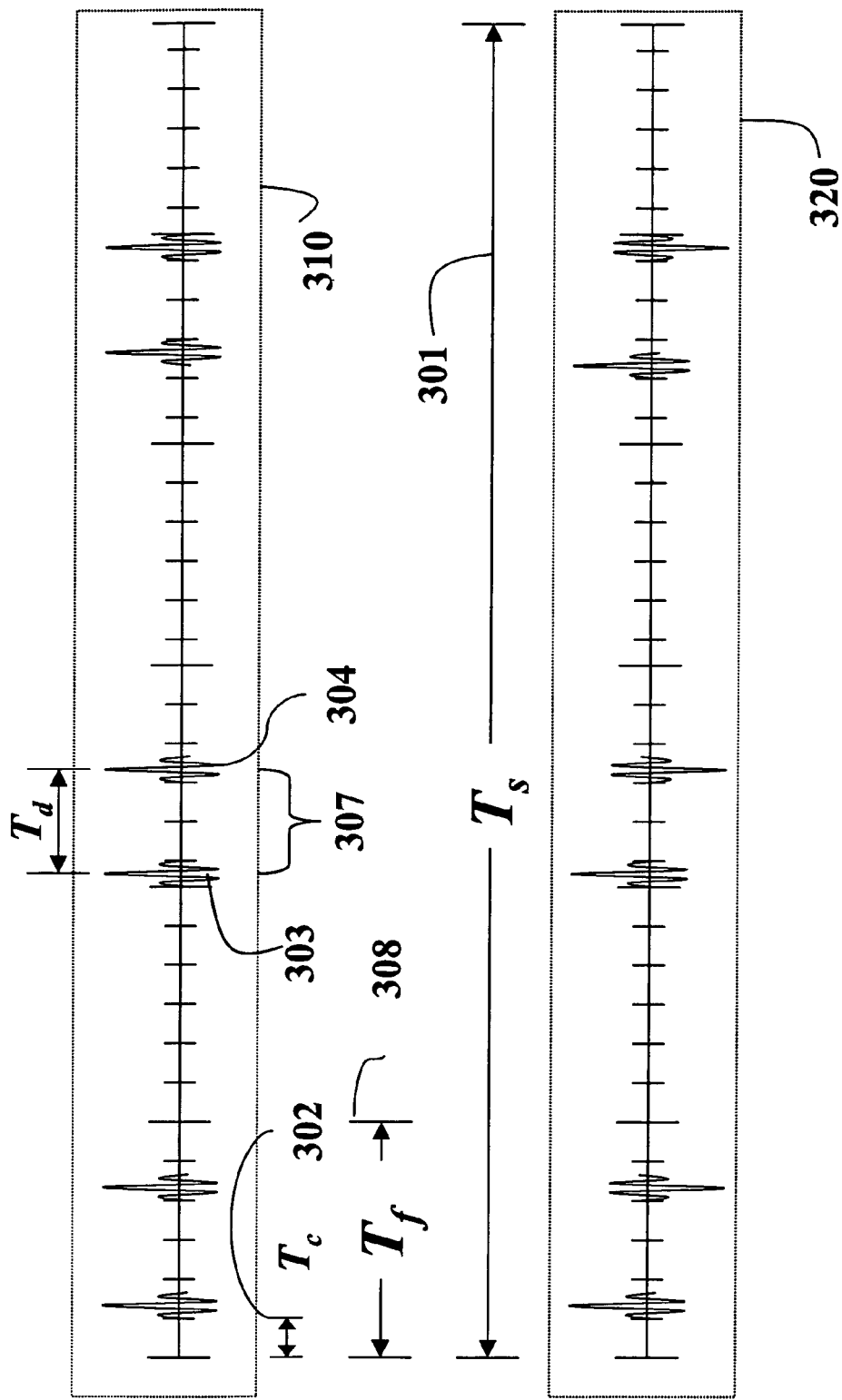
FIG. 3 is a timing diagram of prior art TR-IR modulation.
Figure 4:
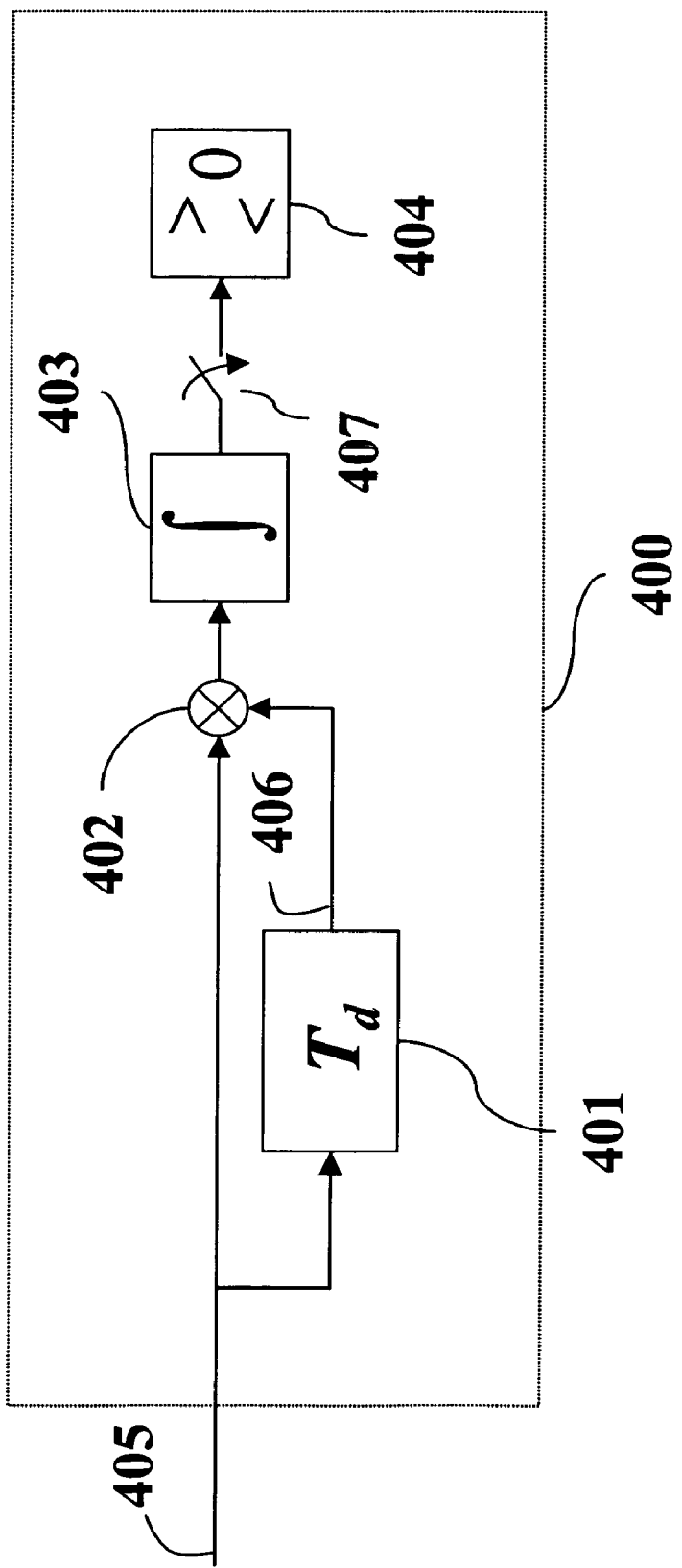
FIG. 4 is a block diagram of a prior art TR-IR receiver.
Figure 5:
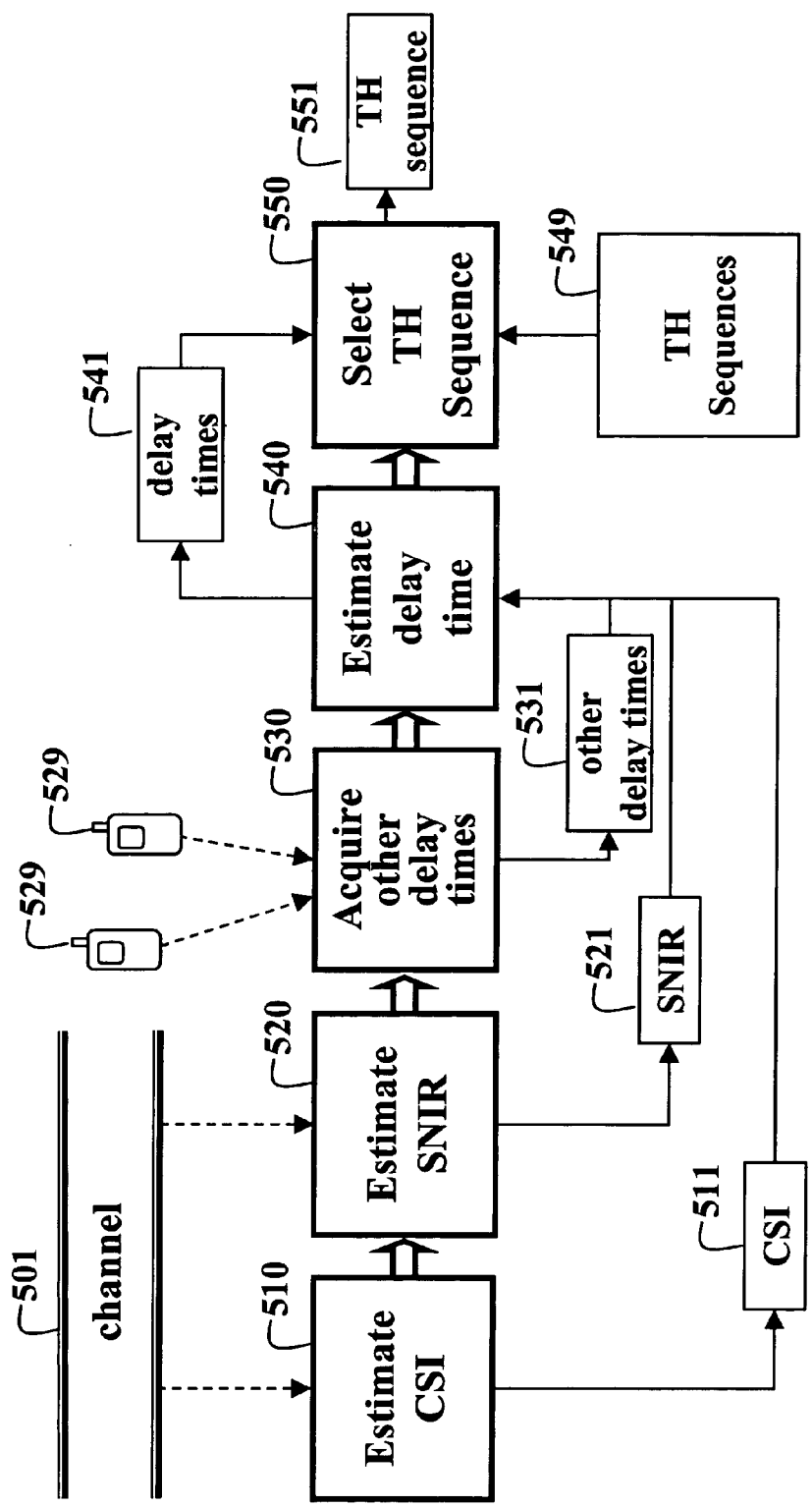
FIG. 5 is flow diagram of a method for determining a delay time according to the invention.

As shown in FIG. 5 our invention provides a system and method 500 for adaptively selecting a delay time between reference pulses and data pulses in a time-reference (TR-IR) impulse radio system. The delay time depends on the channel state information (CSI). The method can be applied to transmitted-reference systems involving time-hopping and to time-hopping systems with incoherent transceivers. It should be noted that at any one time the transceiver can either be transmitting or receiving.

As shown in FIG. 5, a receiver 500 estimates 510 periodically the CSI 511 of a channel 501 between the receiver and a transmitter. This can be done in two ways. The receiver can estimate an instantaneous CSI or an average CSI. In the latter case, the receiver estimates a small-scale, averaged power delay profile or an approximation thereof. An accurate CSI is not necessary for the working the invention. An approximation of the small-scale, averaged power delay profile or even just an estimate of the root-mean-square (RMS) delay spread or the maximum excess delay of the channel can provide benefits. Whether to use the instantaneous or the averaged CSI depends mostly on a ratio between symbol duration and coherence time of the channel. In quasi-static channels, the instantaneous CSI is preferred.

In a second step, the receiver estimates periodically 520 the SNIR 521 of the channel 501. The SNIR can be estimated during a 'quiet' period when no data is transmitted to the receiver. During this time, the receiver is active and 'listening' to the channel. There are a great number of ways to estimate CSI. The invention can work with any conventional method to make these estimates. An overview of channel and interference estimation can be found in J. G. Proakis, *Digital Communications*, fourth edition, McGraw-Hill, New York, 2001.

In an optional third step, the transceiver acquires periodically 530 delay times 531 used by other UWB transceivers 529. This can be done by explicit transmissions by the other transceivers. For example, in the context of a network according to the IEEE 802.15.4 standard, a central coordinator device transmits beacons. The beacons contain the delay times for all other devices under the control of the coordinator device.

After the CSI have been estimated, an optimum delay time 541 is determined 540. The delay time can be determined in either the transmitter or the receiver. If the delay time is determined in the transmitter, then the receiver first sends the CSI to the transmitter.

The optimum delay time minimizes the RMS error between a training signal and the received signal, and coded or uncoded bit error rate (BER), or other suitable criteria. For example, the BER for a transmitted-reference scheme in the presence of noise only is described by S. Gezici, F. Tufvesson, and A. F. Molisch, "On the performance of transmitted-reference impulse radio", Proc. Globecom 2004. Alternatively, the optimum delay time is determined from the BER or RMS error from transmitted data. By 'dithering' the delay time in the transmitter, the transceiver can determine whether a smaller or larger delay time improves the BER. This information is then supplied to the transmitter, and the delay time is adapted accordingly.

We also optimize the time hopping (TH) sequence for the optimum delay time 541. Conventionally, the TH sequence is preselected and optimized for a predetermined fixed delay time. The preselected TH sequence attempts to minimize the number of collisions of pulses per symbol, irrespective of varying relative delays between different transceiver.

The invention adaptively selects 550 a TH sequences 551 that retain good 'collision' properties when truncated to shorter durations. A discrete set of sequences 549 with different lengths can be used. The transmitter selects from this set of sequences the optimum sequence 551 for the optimum delay time 541. The invention can work with any conventional method to make these estimates. An overview of channel and interference estimation can be found in J. G. Proakis, *Digital Communications*, fourth edition, McGraw-Hill, New York, 2001.

EFFECT OF THE INVENTION

The adaptive selection of the delay time according to the invention reduces the effect of multipath fading and multiple access interference. Depending on the environment in which the system is operating, the invention adjusts the delay time to minimize the effect of multipath fading, while at the same time retaining good multiple access capabilities.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for selecting a time hopping sequence according to a delay time between reference pulses and data pulses in a transmitted reference, time-hopping impulse radio system, comprising a transceiver for performing steps of the method, comprising the steps of:
    estimating periodically channel state information of a channel between two transceivers;
    determining the delay time between transmitted reference pulses and transmitted data pulses according to the channel state information;
    acquiring periodically other delay times used by other transceivers of the radio system, and determining the delay times according to the other delay times; and
    selecting periodically a time-hopping sequence according to the delay time.

2. The method of claim 1, in which the channel state information is instantaneous.

3. The method of claim 1, in which the channel state information is based on an instantaneous power delay profile.

4. The method of claim 1, in which the channel state information is averaged over time.

5. The method of claim 1, in which the channel state information is based on a small-scale, averaged power delay profile.

6. The method of claim 1, in which the channel state information is based on a root-mean-square (RMS) delay spread.

7. The method of claim 1, further comprising:
    dithering the delay time in a transmitter.

8. The method if claim 1, in which the other delay time are explicitly transmitted.

9. The method of claim 1, in which the delay time is determined in a receiver, and further comprising:
    transmitting the delay time to a transmitter.

10. The method of claim 1, in which the delay time minimizes a bit error rate of transmitted data.

11. The method of claim 1, in which the delay time minimizes a RMS error between a training signal and a received signal.

12. The method of claim 1, in which the delay time minimizes a coded bit error rate.

13. The method of claim 1, in which the delay time minimizes an uncoded bit error rate.

14. The method of claim 1, in which the delay time minimizes a RMS error of transmitted data.

15. A time-hopped impulse radio system, comprising:
    a receiver configured to estimate periodically channel state information of a channel, and the receiver further comprising:
        means for determining a delay time between reference pulses and data pulses according to the channel state information and other delay times used by other transceivers of the radio system, in which the other delay times are acquired periodically; and
    means for transmitting the delay time; and
    a transmitter configured to receive the delay time.

16. A time-hopped impulse radio system, comprising:
    a receiver configured to estimate periodically channel state information of a channel, and the receiver further comprising:
    means for transmitting the channel state information; and
    a transmitter configured to determine a delay time between reference pulses and data pulses according to the channel state information and other delay times used by other transceivers of the radio system, in which the other delay times are acquired periodically.

17. A method for determining a delay time between reference pulses and data pulses in a transmitted reference, time-hopping impulse radio system, comprising a first transceiver and a second transceiver for performing steps of the method, comprising the steps:
    estimating periodically channel state information of a channel between the first transceiver and the second transceiver transceivers;
    acquiring periodically other delay times used by other transceivers of the radio system; and
    determining the delay time between transmitted reference pulses and data pulses according to the channel state information and the other delay times.

* * * * *